(12) United States Patent
Paczkowski et al.

(10) Patent No.: US 11,778,451 B2
(45) Date of Patent: *Oct. 3, 2023

(54) 5G NETWORK EXPOSURE FUNCTION (NEF) CAPTURING PROCESSOR IDENTITY

(71) Applicant: T-Mobile Innovations LLC, Overland Park, KS (US)

(72) Inventors: Lyle W. Paczkowski, Mission Hills, KS (US); George Jason Schnellbacher, Leawood, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/709,072

(22) Filed: Mar. 30, 2022

(65) Prior Publication Data

US 2022/0225076 A1    Jul. 14, 2022

Related U.S. Application Data

(63) Continuation of application No. 17/009,604, filed on Sep. 1, 2020, now Pat. No. 11,337,056.

(51) Int. Cl.
*H04L 9/00* (2022.01)
*H04L 9/40* (2022.01)
(Continued)

(52) U.S. Cl.
CPC ............ *H04W 8/18* (2013.01); *H04W 4/50* (2018.02); *H04W 4/60* (2018.02); *H04W 8/10* (2013.01);
(Continued)

(58) Field of Classification Search
CPC ......... H04W 8/18; H04W 12/72; H04W 4/60; H04W 8/10; H04W 4/50; H04W 48/18;
(Continued)

(56) References Cited

U.S. PATENT DOCUMENTS 10,491,376 B1    11/2019    Suthar et al.
11,337,056 B1    5/2022    Paczkowski et al.
(Continued)

OTHER PUBLICATIONS

FAIPP Pre-Interview Communication dated Sep. 16, 2021 U.S. Appl. No. 17/009,604, filed Sep. 1, 2020.
(Continued)

*Primary Examiner* — Joseph E Dean, Jr.

(57) ABSTRACT

A method of establishing a network connection between a subscriber device and a network server having a server processor matching a device processor of the subscriber device. The method comprises receiving a processor matching message (PMM) by an Exposure Function (EF) executing on a computer system, where the PMM comprises a request for a network service and an EF attribute representing an identity of a device processor of a subscriber device, determining by the EF the existence of a matching network server offering the requested network service and having a server processor with an identity matching the identity of the device processor, and based on the determination that the matching network server exists, establishing by the EF a connection between the matching network server and the subscriber device.

20 Claims, 5 Drawing Sheets

(51) Int. Cl.
*H04W 8/18* (2009.01)
*H04W 8/10* (2009.01)
*H04W 88/18* (2009.01)
*H04W 4/60* (2018.01)
*H04W 4/50* (2018.01)
*H04W 48/18* (2009.01)
*H04W 12/72* (2021.01)

(52) U.S. Cl.
CPC ........... *H04W 12/72* (2021.01); *H04W 48/18* (2013.01); *H04W 88/18* (2013.01)

(58) Field of Classification Search
CPC ..... H04W 88/18; H04W 12/08; H04W 12/10; H04L 2209/805; H04L 9/50; H04L 63/123; H04L 67/51
See application file for complete search history.

(56) References Cited

U.S. PATENT DOCUMENTS

2018/0376384 A1* 12/2018 Youn ................. H04W 36/0022
2020/0090147 A1    3/2020 Cole

OTHER PUBLICATIONS

Notice of Allowance dated Jan. 26, 2022, U.S. Appl. No. 17/009,604, filed Sep. 1, 2020.

* cited by examiner

5G NETWORK EXPOSURE FUNCTION (NEF) CAPTURING PROCESSOR IDENTITY

CROSS-REFERENCE TO RELATED APPLICATIONS

This application is a continuation of and claims priority under 35 U.S.C. § 120 to U.S. patent application Ser. No. 17/009,604 filed on Sep. 1, 2020, entitled "5G Network Exposure Function (NEF) Capturing Processor Identity" by Lyle W. Paczkowski, et al., which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

New to 5G is Network Exposure Function (NEF) that facilitates the enablement of new and different attestation services for the different elements in 5G. The Service Capability Exposure Function (SCEF) in 3GPP provides service capability exposure that provides a means to securely expose the services and capabilities provided by all the network elements. The NEF provides Ledger Factor (L-Factor) authentication that provides attestation services. If a network element moves within the network, the network element may be re-attested by NEF to provide the proof of change and the authenticity of the network element's mobility.

SUMMARY

In an embodiment, a method of establishing a network connection between a subscriber device and a network server having a server processor matching a device processor of the subscriber device is disclosed. The method comprises receiving a processor matching message (PMM) by an Exposure Function (EF) executing on a computer system, where the PMM comprises a request for a network service and an EF attribute representing an identity of a device processor of a subscriber device, determining by the EF the existence of a matching network server offering the requested network service and having a server processor with an identity matching the identity of the device processor, and based on the determination that the matching network server exists, establishing by the EF a connection between the matching network server and the subscriber device.

In another embodiment, a subscriber device is disclosed. The subscriber device comprises an antenna, a radio transceiver coupled to the antenna, a non-transitory memory, a device processor coupled to the non-transitory memory and to the radio transceiver, and a processor matching application (PMA) stored in the non-transitory memory. When executed by the processor, the PMA obtains from the non-transitory memory an identity of the device processor, sends a processor matching message (PMM) to an Exposure Function (EF) of a network, the PMM comprising a request for a network service and an EF attribute representing the identity of the device processor, receives an identifier of a matching network server offering the requested network service and having a server processor with an identity matching the identity of the device processor, and establishes a network connection between the subscriber device and the matching network server.

In yet another embodiment, a method of establishing a network connection between a subscriber device and a network server having a server processor matching a device processor of the subscriber device is disclosed. The method comprises receiving a processor matching message (PMM) by an Exposure Function (EF) executing on a computer system, where the PMM comprises a request for a network service and an EF attribute representing an identity of a device processor of the subscriber device, and sending by the EF to a distributed ledger server information relating to the PMM, the information including the identity of the device processor. The method further comprises determining by the EF the existence of a matching network server offering the requested network service and having a server processor with an identity matching the identity of the device processor, based on the determination that the matching network server exists, establishing by the EF a connection between the matching network server and the subscriber device, and sending by the EF to the distributed ledger server information relating to the establishment of the connection and information relating to the matching network server, the information including the identity of the server processor.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
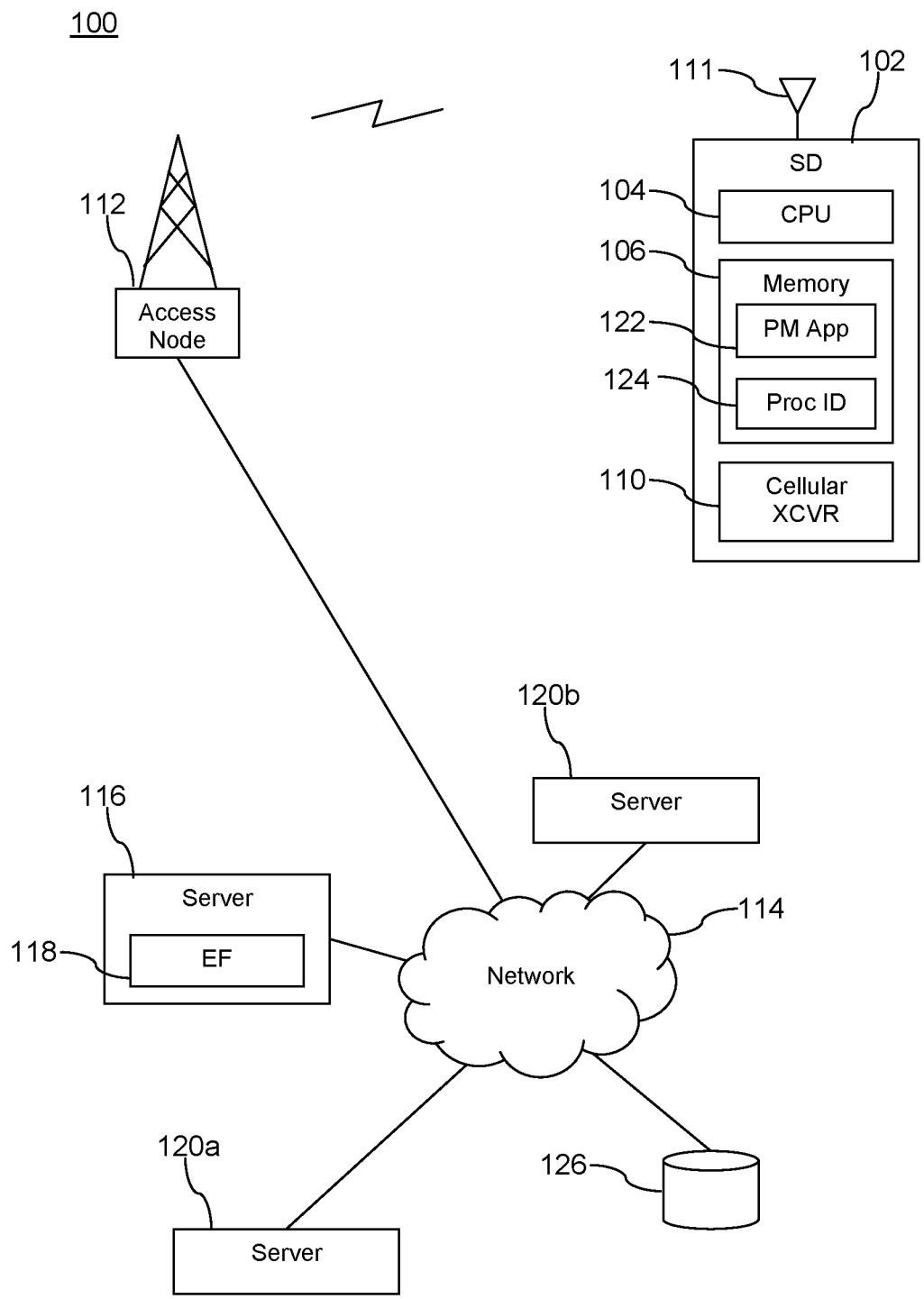
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In 5G it is anticipated that much processing formerly done in the core network will move closer to the edge, whereby to reduce traffic burdens on the core network and to reduce processing latencies. The system and methods of this disclosure supports this by adding a NEF attribute that identifies a hardware architecture of the processor of the subscriber device requesting a network service from the edge. This hardware architecture could identify a major architecture type (e.g., ARM or Intel), it could further detail a specific chip model, it could further detail a specific firmware/operating system environment executed by the chip. This information provided in the NEF attribute could be used in various ways.

One way this information could be used is to match up a subscriber device chip type with an edge server having a processor of the same chip type. For example, John Smith's laptop computer requesting service identifies itself as ARM based and is connected by the 5G network to an edge server using an ARM based processor. John Doe's laptop computer requesting the same service identifies itself as Intel based and is connected by the 5G network to an edge server using an Intel based processor. It is thought that, in some services, matching ARM to ARM and matching Intel to Intel can provide some efficiencies that speed communications or improve efficient use of processors. A NEF function at the edge can promote making these kinds of matches. In some use cases, the NEF function could provide a device with either a generic service (service not paying any attention to matching or non-matching processor architecture) or a matching service. In other use cases, a subscriber device could specify that it wants only a matching server, and if no matching server is available the NEF function would return a "busy" signal to the subscriber device or an error signal.

The system would further track and monitor these edge transactions and store them in a distributed ledger (which may be a Hyperledger) that allows for auditing the transactions, for example establishing identities of the subscriber device processor and the edge server device processor in an immutable way.

In a first embodiment, a subscriber device identifies a hardware processor of the subscriber device and stores the identity of the processor (which may not be a unique identifier but may be an identity of the chip maker and chip model and perhaps a version of an operating system) in a header extension or attribute. The subscriber device then requests a network service, supplying the identity of its processor as part of the request. In response to the request, a NEF function selects a network service and edge server based in part on the identity of the processor of the subscriber device.

In a second embodiment, a Hyperledger may be used to track messages in and out of the edge cloud, how a connection between a subscriber device and an edge server or other network server was established, and creating an audit trail that records processor identities.

A third embodiment resembles the first embodiment, but the subscriber device demands a matching processor in the edge server or other network server and only gets a connection if a server with a matching processor can be linked to the subscriber device.

In a fourth embodiment, the header extension with the processor identity is used to support data thinning and different encryption and compression methods, in particular when there is a processor match between the subscriber device and the edge server or other network server that are using the communication link.

The Exposure Function (EF) described herein is a specific technical solution to one or more specific technical problems. One example of such a technical problem is inefficiencies caused when a subscriber device and an edge server or other network server are using different processor architectures and must execute code to perform encryption/decryption, rather than being able to use hardware-based encryption, as can be done when both device and server are using the different processor architecture. Another example is root of trust security mechanisms that are similar, but different, between different processor architectures, resulting in inefficiencies from intermediation software when establishing a trusted environment between processors of such different architectures. The EF described herein solves these and other problems by providing a process to identify a network server offering a service requested by a subscriber device and having processor architecture that matches a processor architecture of the subscriber device and establishes a connection between the network server and the subscriber device.

It will be appreciated that modern communication networks are more or less continuously evolving. This may present various challenges involved in supporting interworking between newly emerging technology and previous technology. At the time of this filing, wireless communication companies are designing and beginning to deploy 5G wireless technology. 5G is hoped to provide virtually unlimited bandwidth on demand, for example providing access on demand to as much as 10 gigabits per second (gbps) downlink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

5G technology may be bifurcated into 5G radio technology and 5G core network technology. 5G radio technology is commonly referred to as New Radio (NR) and provides support for carrier aggregation (CA), multiple input/multiple output (MIMO) operation, and beam forming operations. 5G core network technology is based on a service based architecture paradigm. Rather than constructing the 5G core network as a series of special purpose communication nodes (e.g., an HSS node, a MME node, etc.), the 5G core network is provided as a set of services or network functions. These network functions can include, for example, an authentication server function (AUSF), an access and mobility management function (AMF), a session management function (SMF), a data storage function (DSF), a network exposure function (NEF), a service capability exposure function (SCEF), a network repository function (NRF), a policy control function (PCF), and other functions. The network functions may be referred to a virtual network functions (VNFs) in some contexts. The 5G core network can provide a network slice to a subscriber, for example an enterprise customer, that is composed of a plurality of 5G network functions that are configured to provide customized communication service for that subscriber, for example to provide communication service in accordance with communication policies defined by the customer.

Turning now to FIG. 1, a system 100 is described. In an embodiment, the system 100 comprises a Subscriber Device (SD) 102. The SD 102 comprises a processor 104, a memory 106, a cellular radio transceiver 110, and an antenna 111. A portion of the memory 106 may be a non-transitory memory and a portion of the memory 106 may be a transitory memory. When properly activated and provisioned, the SD 102 may be able to establish a wireless communication link to a radio access network (RAN), for example to an access node 112. The access node 112 may also be referred to as a cell site or cell tower in some contexts. The access node 112 may provide the SD 102 a communication link to a network 114. The network 114 is one or more public networks, one or more private networks, or a combination thereof. The SD 102 may communicate via the access node 112 and via the network 114 to a server 116 communicatively coupled to the network 114 and to a EF 118 that executes on the server 116. The system 100 further comprises a cloud server 120a and an edge server 120b. The edge server 120b may be a network server directly connected to the communication link to the access node 112, or connected by only a few network hops to the communication link. Messages between the SD 102 and the edge server 120b will thus experience low latency in completion. The cloud server 120a may be many network hops removed from the communication link to the access node 112, possibly resulting in high latency in messages between the SD 102 and the cloud server 120a.

The server 116, the server 120a, and the server 120b may be implemented as computer systems. Computer systems are described further hereinafter. The EF 118 may be a Network Exposure Function in a 5G network or a Service Capability Exposure Function in a 4G network.

In some embodiments, the system 100 further includes a distributed ledger 126 hosted on servers maintained by the network operator or by fully trusted mobile network operators (MNOs) partners and accessible by third parties under agreed conditions. The distributed ledger 126 constitutes a consensus system that provides a desired level of security. The distributed ledger 126 can be audited, for example by the fully trusted MNOs, to evaluate the conduct of quasi-trusted MNOs and untrusted MNOs, for example to verify that they are adhering to terms of conditions for being granted use of the system. The distributed ledger 126 may be implemented as a Hyperledger.

The SD 102 may be a mobile communication device (e.g., cell phone, mobile phone, personal digital assistant (PDA), smart phone, an Internet of things (IoT) device, laptop computer, tablet computer, notebook computer, wearable computer, headset computer, and the like). Where the SD 102 is an IoT device, the SD 102 may be part of a refrigerator, a heating ventilation and air conditioning (HVAC) system, a remote sensor, a remote control device, or other kind of appliance or system.

Non-transitive memory of the memory 106 of the SD 102 stores an identity 124 of the processor 104. The processor identity 124 includes a processor architecture of the processor 104 (such as Advanced RISC Machines (ARM) or Intel), and may also include information about the processor 104 such as a model number, an identifier of the processor chip foundry, a firmware or operating system environment executed by the processor 104. The processor identity 124 may include similar information about a kernel of the SD 102 or other elements of the SD 102, such as a graphics processing unit (GPU), encryption hardware, a terminal controller, a device controller, a memory controller, a CPU scheduler, and a virtual memory.

For any of the examples above, the processor identity 124 may include a version number for the firmware, software, or hardware element. The examples above are non-limiting examples and do not constrain the scope of the disclosure. As will be seen below, the system disclosed herein may be extended to encompass any information about the SD 102, the server 120a, and the server 120b that (i) enable improvements in efficiency or bandwidth usage, or (ii) support compliance monitoring and auditing of the system 100 and subscriber devices and network servers connected thereto.

Records of information such as processor identity 124 for subscriber devices and servers communicating using the system 100 (as well as the communications themselves) may be stored in the distributed ledger 126. Storing this information in a distributed ledger can provide both transparency and confidence that the information about processor identities and communications has not been tampered with. Blockchains are deemed to be tamperproof or tamper resistant, and consequently server 116, server 120a, and server 120b can justifiably and prudently be assured of the integrity of information stored in the distributed ledger 126.

The non-transitory memory of the memory 106 of the SD 102 also includes a processor matching application (PMA) 122 that, when executed by the processor 104, sends a processor matching message (PMM) to the EF 118 to obtain a connection between the SD 102 and a network server of the system 100. The PMM includes a request for a network service and an EF attribute comprising processor identity information obtained from the non-transitory memory of the memory 106 of the SD 102, where the processor identity information relates to the processor architecture and any other elements from the processor identity 124 that are appropriate to the requested network service. For example, where the requested network service requires encrypted Internet Protocol (IP) packets, the EF attribute may further include information relating to encryption hardware in the processor 104 or the SD 102. Similarly, where the service requires establishment of a Root of Trust (RoT) trusted computing environment, the EF attribute may further include information relating to a version number of the Trust Execution Environment (for ARM) or Software Guard Extensions (for Intel) implemented in the SD 102.

The PMA 122 sends the PMM to the EF 118 and subsequently receives a response message from the EF 118 identifying a matching network server offering the requested network service and having a server processor with processor identity information matching the processor identity information in the PMM. The PMA 122 then establishes a network connection with the identified matching network server using conventional processes.

The response message from the EF 118 may identify a network server that is a partial match for the information in the PMM. Such a partial-match network server may provide the requested network service, but have different processor identity information than that included in the PMM. The PMA (or other firmware or software in the SD 102) may or may not establish the network connection with the identified partial-match network server, as appropriate for the requested network service.

The PMM may include information indicating to the EF 118 that the identified matching network server must match both the requested service and the processor identity information in the PMM. Once the network connection with the identified matching network server is established, the SD 102 may communicate with the matching network server using network functions that are proprietary to the processor architecture or other hardware of the SD 102. Examples of such proprietary functions include an RoT function, an encryption function, a compressed IP header function, and a token bucket function.

The EF 118 may receive the PMM sent by the SD 102. In response to receiving the PMM, the EF 118 may obtain information relating to candidate network servers offering the network service requested in the PMM and further obtain information relating to each candidate server's processor identity. In some embodiments, only cloud servers or only edge servers may be included among the candidate servers based on the SD 102 requesting only one or the other type of server via information in the PMM. In some embodiments, the EF 118 may include only one or the other type of server in the candidate servers based on the type of network service requested in the PMM; for example, where the requested service requires low latency communication, the EF 118 may include only edge servers in the candidate servers.

Based on the candidate network servers' processor identity information, the EF 118 determines whether there exists among the candidate network servers a matching network server having a server processor with processor identity information matching the processor identity information in the PMM. If such a matching network server is determined to exist, the EF 118 establishes a connection between the matching network server and the subscriber device using conventional processes. Information identifying the matching network server may be sent to the SD 102 to enable the SD 102 to establish the connection.

The EF 118 may determine that a partial-match network server provides the requested network service, but has different server processor identity information than that included in the PMM. Based on this determination, the EF 118 may send to the SDA 102 information identifying the partial-match network server. Where the PMM includes information indicating that the SD 102 will accept only a network server that fully matches the information in the PMM, the EF 118 may not establish a connection between the SD 102 and the partial-match network server, or may not send to the SD 102 information identifying the partial-match network server. In some embodiments, the EF 118 may determine not to establish connections to partial-match network servers based on the requested network service or due to network or server policies.

Figure 2:
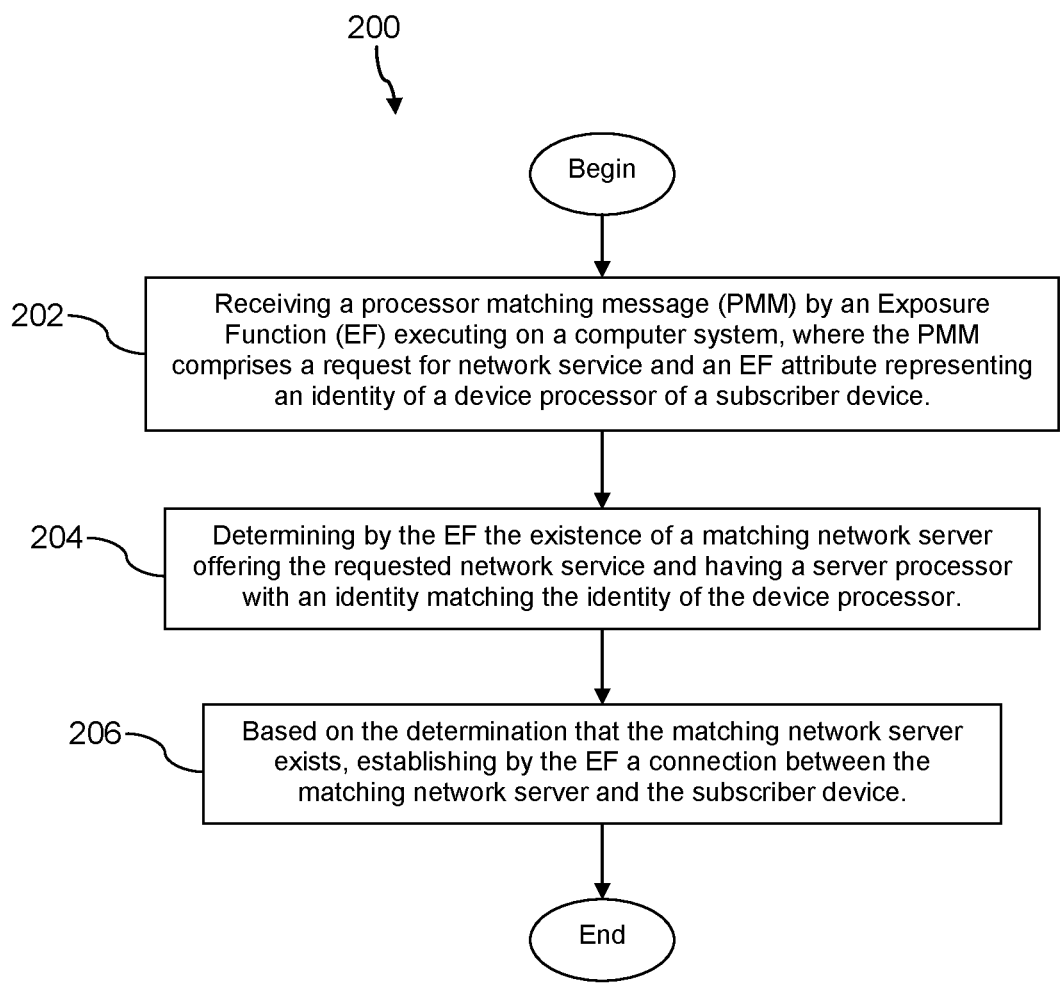
FIG. 2 is a flow chart of a method according to an embodiment of the disclosure.

FIG. 2 is a flow chart of a method 200 according to an embodiment of the disclosure. In an embodiment, the method 200 is a method of the EF 118 establishing a connection between the SD 102 and a server that provides a network service requested by the SD 102 and has a processor identity matching that of the SD 102. At block 202, the method 200 comprises receiving by the EF 118 from the SD 102 a processor matching message (PMM). The PMM comprises a request for network service and an EF attribute representing an identity of a device processor of the SD 102.

At block 204, the method 200 comprises determining by the EF 118 the existence of a matching network server offering the requested service and having a server processor with an identity matching the identity of the device processor of the SD 102. In an embodiment, at block 204, the EF 118, based on either information in the PMM or the requested network service, determines the existence of a matching edge server.

At block 206, the method 200 comprises the EF 118, based on determining that the matching network server exists, establishing a connection between the matching network server and the SD 102. In an embodiment, at block 206, the EF 118, based on determining that the matching network server does not exist, may establish a connection between the SD 102 and a partial-match network server offering the requested network service and having a server processor identity different from the identity of the device processor of the SD 102. In another embodiment, at block 206, the EF 118, based on determining that the matching network server does not exist, sends a message to the SD 102 indicating that no connection has been established to any network server.

In an embodiment, at block 206, the EF 118 establishes a connection between the matching network server and the SD 102 using conventional processes. In other embodiments, information identifying the matching network server may be sent to the SD 102 and the SD 102 may establish the connection.

Figure 3:
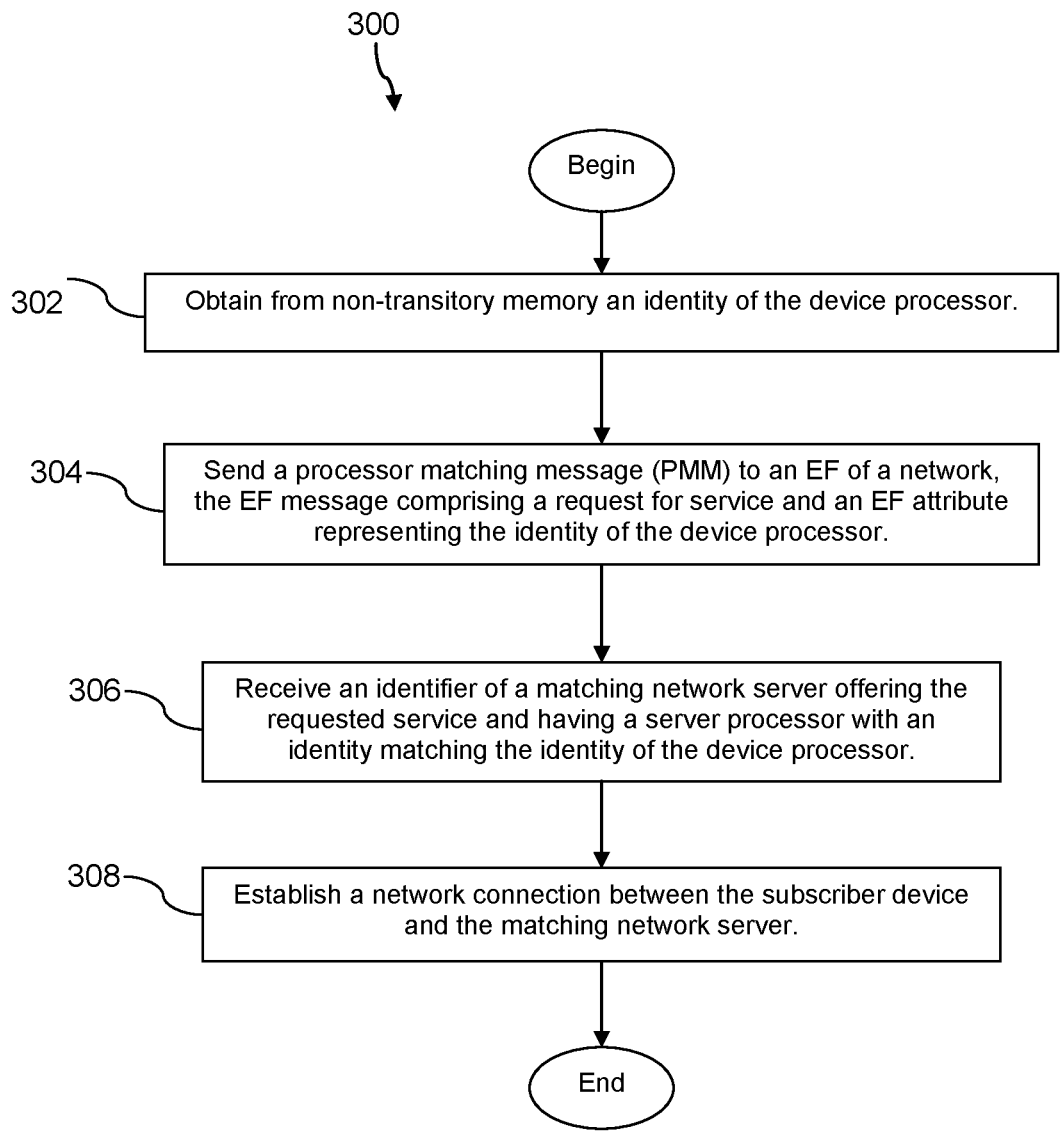
FIG. 3 is a flow chart of another method according to an embodiment of the disclosure.

FIG. 3 is a flow chart of another method 300 according to an embodiment of the disclosure. In an embodiment, the method 300 is a method of the SD 102 requesting a connection between the SD 102 and a server that provides a network service requested by the SD 102 and has a processor identity matching that of the SD 102. At block 302, the method 300 comprises the SD 102 obtaining from non-transitory memory of the memory 106 the processor identity 124—an identity of the device processor of the SD 102. At block 304, the method 300 comprises the SD 102 sending a PMM to an EF of a network (the EF 118). The EF message comprising a request for service and an EF attribute representing the processor identity 124.

At block 306, the method 300 comprises the SD 102 receiving an identifier of a matching network server offering the requested service and having a server processor with an identity matching the processor identity 124. At block 306, the method 300 comprises the SD 102 establishing a network connection between the SD 102 and the matching network server, where such a network connection has not already been established by the EF 118.

In an embodiment, at block 306, the SD 102 receives an identifier of a partial-match network server offering the requested network service and having a server processor with an identity different than the processor identity 124. In such an embodiment, at block 308, the SD 102 establishes a network connection between the SD 102 and the partial-match network server. In an embodiment, the PMM comprises a request for a connection only to a server processor with an identity matching the identity of the device processor. In another embodiment, the PMM comprises a request for a connection only to an edge server.

In various embodiments, based on establishment of the network connection between the SD 102 and the matching network server, in communicating with the matching network server the SD 102 utilizes a RoT function, a compressed IP header function, a token bucket function, and/or an encryption function that is proprietary to a manufacturer of the processor 104.

Figure 4:
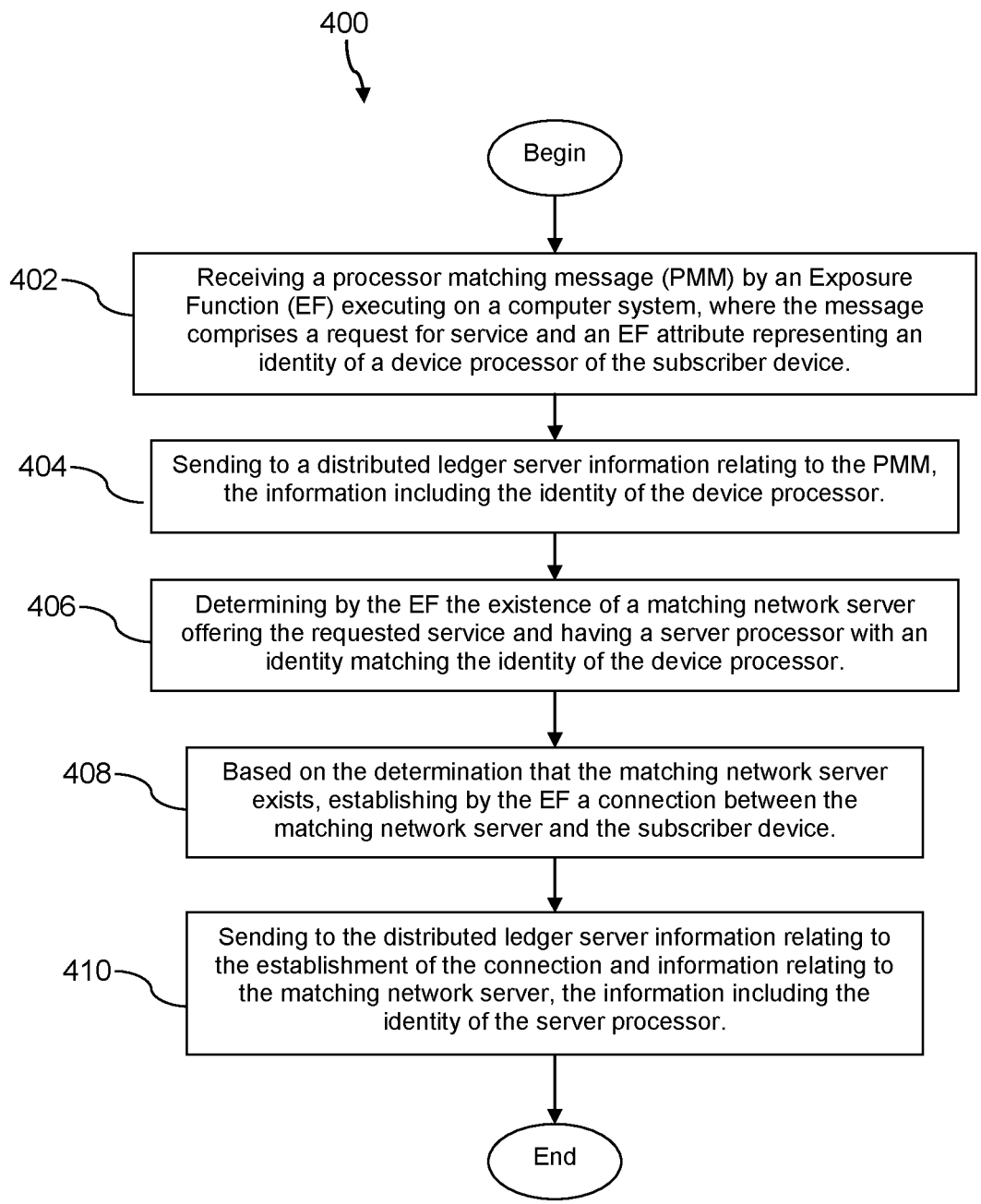
FIG. 4 is a flow chart of yet another method according to an embodiment of the disclosure.

FIG. 4 is a flow chart of yet another method 400 according to an embodiment of the disclosure. In an embodiment, the method 400 is a method of the EF 118 establishing a connection between the SD 102 and a server that provides a network service requested by the SD 102 and has a processor identity matching that of the SD 102, while sending information about the SD 102, the server, and the establishment of the connection to a distributed ledger server.

At block 402, the method 400 comprises receiving by the EF 118 from the SD 102 a PMM. The PMM comprises a request for network service and an EF attribute representing an identity of a device processor of the SD 102. At block 404, the method 400 comprises the EF 118 sending to a distributed ledger server information relating to the PMM, the information including the identity of the device processor of the SD 102.

At block 406, the method 400 comprises determining by the EF 118 the existence of a matching network server offering the requested service and having a server processor with an identity matching the identity of the device processor of the SD 102. At block 408, the method 400 comprises the EF 118, based on determining that the matching network server exists, establishing a connection between the matching network server and the SD 102. At block 410, the method 400 comprises the EF 118 sending to a distributed ledger server information relating to the establishment of the connection and information relating to the matching network server, the information including the identity of the server processor.

In an embodiment, at block 408, the EF 118, based on determining that the matching network server does not exist, may establish a connection between the SD 102 and a partial-match network server offering the requested network service and having a server processor identity different from the identity of the device processor of the SD 102. In such an embodiment, at block 410, the EF 118 sends to a distributed ledger server information relating to the establishment of the connection and information relating to the partial-match network server, the information including the identity of the server processor.

In an embodiment, the method 400 further comprises the EF 118 receiving a further message relating to one of the SD 102, the matching network server, and the connection between the SD 102 and the matching network server. In such an embodiment, the method 400 also comprises the EF 118 sending to the distributed ledger server information relating to the further message, the connection between the subscriber device and the matching network server, and the one of the subscriber device and the matching network server, the information including the identity of the processor of the one of the subscriber device and the matching network server.

In some systems, the EF 118 may match the SD 102 with a network server (for example the edge server 120b) with which the SD 102 may establish a trusted computing environment, so that the edge server 120b may provide a backup function for the SD 102. In a 5G Replication Slice, implemented as a Virtual Network Function (VNF), the edge server 120b provides the SD 102 the ability to immutably backup selected elements, as described below.

The 5G Replication Slice may be in the form of a Virtual Hard Disk (VHD). This is a file format representing a virtual hard disk drive (HDD). It may contain what is found on a physical HDD, such as disk partitions and a file system, which in turn can contain files and folders. It is typically used as the hard disk of a virtual machine. In the 5G Replication Slice, the VHD would hold several more components rather than just raw data files.

The SD 102 may store in the VHD further backup information about system services such as shells, compilers, and network access provided by the SD 102. The backup may also include information about application programs, resident system programs, device drivers, and ROM BIOS device drivers of the SD 102.

The backup may further include mobile or cellphone information about the SD 102, such as system calls, system programs, system structure, and virtual machines. The backup may include further cellular system design and implementation information about the SD 102, such as PEI (Permanent Equipment Identifier), IMEI (International Mobile Equipment Identity), GPSI (General Public Subscription ID), MSISDN (Telephone number), SUPI (Subscriber Permanent ID), IMSI (International Mobile Subscriber Identity), NAI (Network Access Identifier), SUCI (Sub Concealed ID), 5G-TMSI (5G temp Mobile Sub ID), 5G-GUTI (5G globally unique Temp ID), and GUAMI (Globally unique AMF ID).

Figure 5:
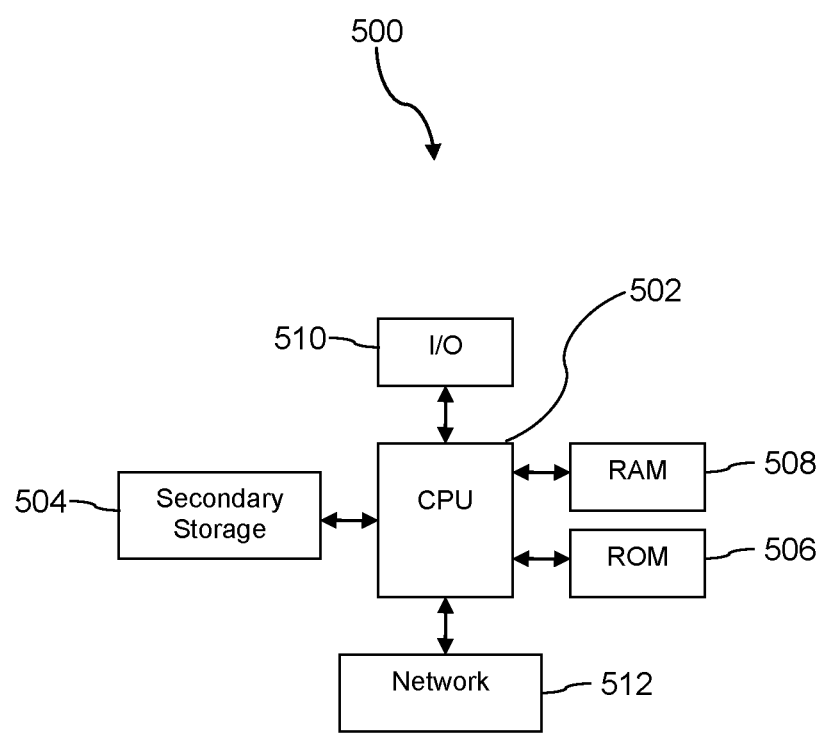
FIG. 5 illustrates a computer system suitable for implementing one or more embodiments disclosed herein.

FIG. 5 illustrates a computer system 500 suitable for implementing one or more embodiments disclosed herein. The computer system 500 includes a processor 502 (which may be referred to as a central processing unit or CPU) that is in communication with memory devices including secondary storage 504, read only memory (ROM) 506, random access memory (RAM) 508, input/output (I/O) devices 510, and network connectivity devices 512. The processor 502 may be implemented as one or more CPU chips.

It is understood that by programming and/or loading executable instructions onto the computer system 500, at least one of the CPU 502, the RAM 508, and the ROM 506 are changed, transforming the computer system 500 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 500 is turned on or booted, the CPU 502 may execute a computer program or application. For example, the CPU 502 may execute software or firmware stored in the ROM 506 or stored in the RAM 508. In some cases, on boot and/or when the application is initiated, the CPU 502 may copy the application or portions of the application from the secondary storage 504 to the RAM 508 or to memory space within the CPU 502 itself, and the CPU 502 may then execute instructions that the application is comprised of. In some cases, the CPU 502 may copy the application or portions of the application from memory accessed via the network connectivity devices 512 or via the I/O devices 510 to the RAM 508 or to memory space within the CPU 502, and the CPU 502 may then execute instructions that the application is comprised of. During execution, an application may load instructions into the CPU 502, for example load some of the instructions of the application into a cache of the CPU 502. In some contexts, an application that is executed may be said to configure the CPU 502 to do something, e.g., to configure the CPU 502 to perform the function or functions promoted by the subject application. When the CPU 502 is configured in this way by the application, the CPU 502 becomes a specific purpose computer or a specific purpose machine.

The secondary storage 504 is typically comprised of one or more disk drives or tape drives and is used for non-volatile storage of data and as an over-flow data storage device if RAM 508 is not large enough to hold all working data. Secondary storage 504 may be used to store programs which are loaded into RAM 508 when such programs are selected for execution. The ROM 506 is used to store instructions and perhaps data which are read during program execution. ROM 506 is a non-volatile memory device which typically has a small memory capacity relative to the larger memory capacity of secondary storage 504. The RAM 508 is used to store volatile data and perhaps to store instructions. Access to both ROM 506 and RAM 508 is typically faster than to secondary storage 504. The secondary storage 504, the RAM 508, and/or the ROM 506 may be referred to in some contexts as computer readable storage media and/or non-transitory computer readable media.

I/O devices 510 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 512 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 512 may provide wired communication links and/or wireless communication links (e.g., a first network connectivity device 512 may provide a wired communication link and a second network connectivity device 512 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 512 may enable the processor 502 to communicate with the Internet or one or more intranets. With such a network connection, it is contemplated that the processor 502 might receive information from the network, or might output information to the network in the course of performing the above-described method steps. Such information, which is often represented as a sequence of instructions to be executed using processor 502, may be received from and outputted to the network, for example, in the form of a computer data signal embodied in a carrier wave.

Such information, which may include data or instructions to be executed using processor 502 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 502 executes instructions, codes, computer programs, scripts which it accesses from hard disk, floppy disk, optical disk (these various disk based systems may all be considered secondary storage 504), flash drive, ROM 506, RAM 508, or the network connectivity devices 512. While only one processor 502 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 504, for example, hard drives, floppy disks, optical disks, and/or other device, the ROM 506, and/or the RAM 508 may be referred to in some contexts as non-transitory instructions and/or non-transitory information.

In an embodiment, the computer system 500 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 500 to provide the functionality of a number of servers that is not directly bound to the number of computers in the computer system 500. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 500, at least portions of the contents of the computer program product to the secondary storage 504, to the ROM 506, to the RAM 508, and/or to other non-volatile memory and volatile memory of the computer system 500. The processor 502 may process the executable instructions and/or data structures in part by directly accessing the computer program product, for example by reading from a CD-ROM disk inserted into a disk drive peripheral of the computer system 500. Alternatively, the processor 502 may process the executable instructions and/or data structures by remotely accessing the computer program product, for example by downloading the executable instructions and/or data structures from a remote server through the network connectivity devices 512. The computer program product may comprise instructions that promote the loading and/or copying of data, data structures, files, and/or executable instructions to the secondary storage 504, to the ROM 506, to the RAM 508, and/or to other non-volatile memory and volatile memory of the computer system 500.

In some contexts, the secondary storage 504, the ROM 506, and the RAM 508 may be referred to as a non-transitory computer readable medium or a computer readable storage media. A dynamic RAM embodiment of the RAM 508, likewise, may be referred to as a non-transitory computer readable medium in that while the dynamic RAM receives electrical power and is operated in accordance with its design, for example during a period of time during which the computer system 500 is turned on and operational, the dynamic RAM stores information that is written to it. Similarly, the processor 502 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of establishing a network connection for providing a network service to a subscriber device from a network server having a server processor matching a device processor of the subscriber device, the method comprising:
   receiving a processor matching message by an Exposure Function executing on a computer system, where the processor matching message comprises a request for the network service and an Exposure Function attribute representing an identity of the device processor of the subscriber device;
   determining by the Exposure Function the existence of a matching network server offering the requested network service and having the server processor with an identity matching the identity of the device processor; and
   based on the determination that the matching network server exists, establishing by the Exposure Function a connection between the matching network server and the subscriber device.

2. The method of claim 1, wherein the identity of the device processor comprises a processor architecture type of the device processor.

3. The method of claim 1, further comprising, based on the determination that the matching network server does not exist, sending a message to the subscriber device indicating that no connection has been established to any network server.

4. The method of claim 1, wherein, based on one of information in the processor matching message and the requested network service, determining by the Exposure Function the existence of the matching network server comprises determining by the Exposure Function the existence of a matching edge server.

5. The method of claim 1, wherein the Exposure Function is one of a Service Capability Exposure Function (SCEF) in a 4G network and a Network Exposure Function (NEF) in a 5G network.

6. The method of claim 1, wherein the subscriber device comprises one of a smart phone, a laptop computer, a tablet computer, and an Internet of Things (IoT) device.

7. The method of claim 1, wherein the identity of the device processor includes one or more of a processor architecture type, a chip model of the device processor, and a firmware or operating system environment executed by the device processor.

8. A subscriber device configured to obtain a network service from a network server having a server processor matching a device processor of the subscriber device, the subscriber device comprising:
   an antenna;
   a radio transceiver coupled to the antenna;
   a non-transitory memory;
   a device processor coupled to the non-transitory memory and to the radio transceiver; and
   a processor matching application stored in the non-transitory memory that, when executed by the processor:
      obtains from the non-transitory memory an identity of the device processor;
      sends a processor matching message to an Exposure Function of a network, the processor matching message comprising a request for a network service and an Exposure Function attribute representing the identity of the device processor;
      receives an identifier of a matching network server offering the requested network service and having a server processor with an identity matching the identity of the device processor; and
      establishes a network connection between the subscriber device and the matching network server.

9. The subscriber device of claim 8, wherein the processor matching message comprises information indicating that the matching network server must match both the requested network service and identity of the device processor.

10. The subscriber device of claim 8, wherein the processor matching message comprises a request for a connection only to a server processor with an identity matching the identity of the device processor.

11. The subscriber device of claim 8, wherein the processor matching message includes information requesting connection only to an edge server.

12. The subscriber device of claim 8, wherein the processor matching message is one of a Service Capability Exposure Function (SCEF) message in a 4G network and a Network Exposure Function (NEF) message in a 5G network.

13. The subscriber device of claim 8, wherein the identity of the device processor includes one or more of a processor architecture type, a chip model of the device processor, and a firmware or operating system environment executed by the device processor.

14. The subscriber device of claim 8, wherein, based on establishment of the network connection between the subscriber device and the matching network server, in communicating with the matching network server the device processor utilizes one of a Root of Trust (RoT) function, a compressed Internet Protocol (IP) header function, a token bucket function, and an encryption function that is proprietary to a manufacturer of the device processor.

15. A method of establishing a network connection for providing a network service to a subscriber device from a network server having a server processor matching a device processor of the subscriber device, the method comprising:

obtaining, by a processor matching application stored in a non-transitory memory of the subscriber device and executable by a processor of the subscriber device, an identity of the device processor from the non-transitory memory, wherein the identity of the device processor comprises a processor architecture type of the device processor;

sending, by the processor matching application, a processor matching message to an Exposure Function of a network, the processor matching message comprising a request for a network service and an Exposure Function attribute representing the identity of the device processor;

receiving, by the processor matching application, an identifier of a matching network server offering the requested network service and having a server processor with an identity matching the identity of the device processor; and establishing, by the processor matching application, a network connection between the subscriber device and the matching network server.

16. The method of claim 15, wherein the processor matching message comprises information indicating that the matching network server must match both the requested network service and identity of the device processor.

17. The method of claim 15, wherein, based on one of information in the processor matching message and the requested network service, determining by the Exposure Function the existence of the matching network server comprises determining by the Exposure Function the existence of a matching edge server.

18. The method of claim 15, wherein the identity of the device processor further comprises one or more of a chip model of the device processor or a firmware or operating system environment executed by the device processor.

19. The method of claim 15, wherein the Exposure Function is one of a Service Capability Exposure Function (SCEF) in a 4G network and a Network Exposure Function (NEF) in a 5G network.

20. The method of claim 15, wherein the subscriber device comprises one of a smart phone, a laptop computer, a tablet computer, and an Internet of Things (IoT) device.

\* \* \* \* \*